United States Patent [19]

Hall, Jr.

[11] 4,349,896
[45] Sep. 14, 1982

[54] DIGITAL ACOUSTIC LOGGING METHOD AND APPARATUS

[75] Inventor: Hugh E. Hall, Jr., Huntsville, Tex.

[73] Assignee: Halliburton Company, Duncan, Okla.

[21] Appl. No.: 211,601

[22] Filed: Dec. 1, 1980

[51] Int. Cl.³ .............................................. G01V 1/40
[52] U.S. Cl. ....................................... 367/26; 367/28;
367/29; 367/40; 367/98; 181/103; 364/825;
179/15.55 T
[58] Field of Search ........................ 367/26, 28, 29, 30,
367/31, 40, 47, 98; 181/103; 340/858, 861;
179/15.55 T; 375/25; 455/296; 370/109;
364/411, 412, 825

[56] References Cited

U.S. PATENT DOCUMENTS

| | | | |
|---|---|---|---|
| 3,289,157 | 11/1966 | Brokow | 367/26 |
| 3,305,785 | 2/1967 | Carrol | 179/15.55 T |
| 3,435,224 | 3/1969 | Temenek | 340/861 |
| 3,599,175 | 8/1971 | Hollingsworth et al. | 367/47 |
| 3,944,965 | 3/1976 | Caforin et al. | 367/98 |
| 4,012,712 | 3/1977 | Nelligan | 181/103 |
| 4,027,281 | 5/1977 | Greve et al. | 367/28 |
| 4,042,907 | 8/1977 | Trouiller | 367/26 |
| 4,210,966 | 7/1980 | Lugran | 181/103 |
| 4,216,536 | 8/1980 | Mou | 367/40 |
| 4,307,380 | 12/1981 | Garder | 179/15.55 T |

FOREIGN PATENT DOCUMENTS 1199336  7/1970  United Kingdom .................. 367/28

Primary Examiner—Nelson Moskowitz
Attorney, Agent, or Firm—William J. Beard

[57] ABSTRACT

A well-logging method and apparatus in which a fast real time portion of a logging signal is sequentially sampled at discrete times. These sampled segments are stored and then are clocked out of storage over an expanded time period.

The rms amplitude portion of the logging signal occurring prior to the compression wave part of the logging signal (the nominal noise level) may be used for AGC regulation of an amplifier which amplifies the time-expanded output.

A similar development of an rms value can be used for establishing a threshold level for a peak detector, which level is set slightly higher than such rms value. The first three successive samples greater than the threshold level detected by the detector are presumed to be the first three samples of the compression wave. This presumed compression wave is recorded and convolved against the expanded-time digital form of the logging signal to locate the compression wave in a second received signal and, later, the similarly appearing "shear" wave.

7 Claims, 5 Drawing Figures

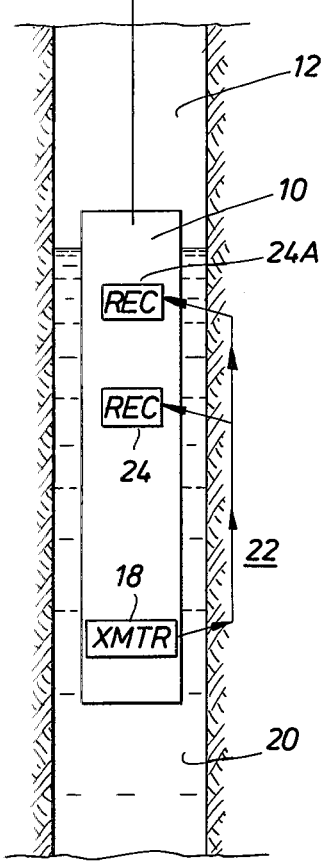
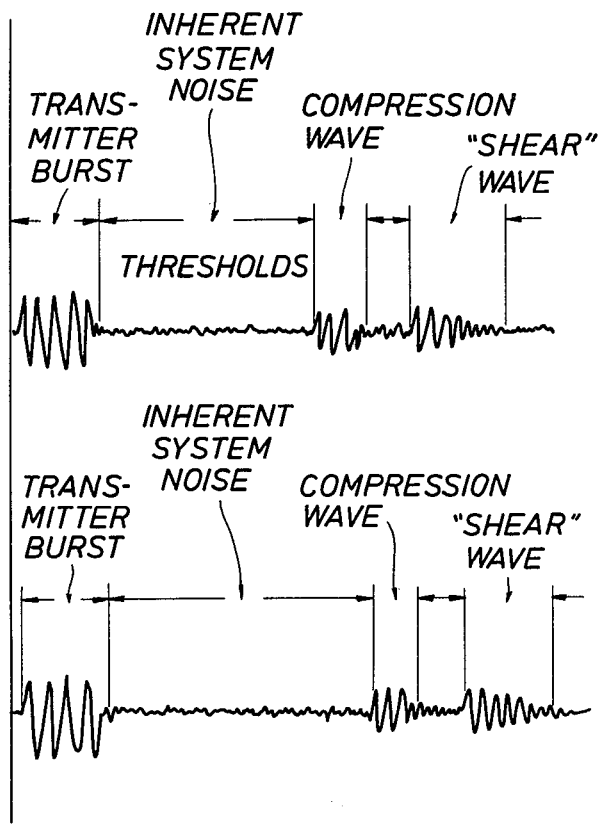
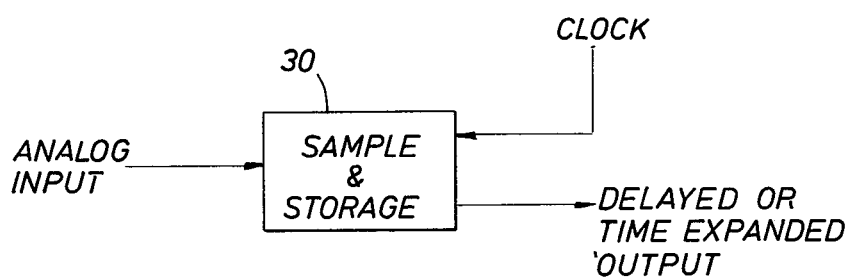
FIG.1
FIG.2
FIG.3

DIGITAL ACOUSTIC LOGGING METHOD AND APPARATUS

BACKGROUND OF THE INVENTION

1. Field of the Invention

The invention pertains to acoustical well logging and more particularly to digitally treating well-logging signals so as to more accurately determine the presence, location and amplitude of the compression wave and the "shear" wave in a more reliable manner than in the prior art.

2. Description of the Prior Art

Conventionally, the received analog logging signal is detected at the surface from the cable connected to the downhole logging tool and amplified in a manually controlled amplifier. The output of the amplifier is applied to time measuring circuits where the zero-crossing location of the signal after the arrival of a signal greater than a preset threshold level, is used as the time reference point for the onset of the compression wave. As mentioned, it is conventional that the gain of the amplifier be log-operator dependent. Further, it is common to make one logging run while setting the amplifier and then make another run at the amplifier setting for developing the actual logging signal to be utilized in analysis.

Because of the presence of noise it is also desirable to use correlation techniques in order to ascertain the arrival time of the "shear" wave. The use of analog correlation techniques are limited by the dynamic range of the correlation devices.

Therefore, it is desirable to use digitization, or digitized data, for correlation purposes. Fast sample rates on the order of two microseconds are often needed. The desirable dynamic range of 60–70 d.b. dictates the use of approximately twelve bits in the analog-to-digital converter. ADC circuits and amplifiers operating under these conditions are expensive and only marginally reliable. Further, when the processing is done in real time, the amplifier gain must be preset prior to the arrival of the acoustic wave to be analyzed. Since using a prior received signal may not be the same as for a later signal, such setting is undesirable.

Therefore, it is a feature of the present invention to provide an improved method and apparatus for digitally sampling an acoustical logging signal and processing such signal at a delayed time or in an expanded time frame.

It is another feature of the present invention to provide an improved method and apparatus for establishing an automatic gain control value from a measured value of the logging signal prior to the arrival of the compression wave, digitizing a portion of the logging signal prior to amplification and controlling the gain of the digital amplifier with the automatic gain control value, thereby making the log amplifier independent of a manual setting by the log operator.

It is yet another feature of the present invention to provide an improved method and apparatus wherein the logging signal is subjected to peak detection having a floating threshold based on an rms determination of residual noise, such peak detection determining the approximate time position and approximate appearance of the compression wave for convolving against the digitized logging signal for accurate time placement of the compression wave.

SUMMARY OF THE INVENTION

The method and apparatus for processing a received analog signal in accordance with the present invention utilizes a sample and storage device that sequentially samples the amplitude values of a real time portion of the received signals and then subsequently reads the values out over an expanded period of time.

In a preferred embodiment of the invention, the expanded output is amplified by an automatic gain controlled (AGC) amplifier. The AGC signal is determined by reading a portion of the stored values and determining either the rms value thereof or a peak value of such portion. Since the expanded output is a delayed reading, there is ample time for developing the AGC signal before the amplification is required.

In a preferred embodiment application of the above, the recognition of the compression wave is assured for purposes of determining its arrival time and measuring its amplitude by way of a convolving scheme. First, the wave arrival is approximated. This is done by measuring the rms value of the inherent noise before the compression wave arrival, adding a value thereto, and detecting the first three successive samples greater than this value that follow such nominal-noise time period. The first of the three samples is then assumed to be the approximate onset of the compression wave. This presumed compression wave is stored and then convolved against the expanded-time digitally sampled and stored signal from a second receiver as described above until the compression wave is indicated. Further convolving results in identification and location of the "shear" wave.

BRIEF DESCRIPTION OF THE DRAWINGS

So that the manner in which the above-recited features and advantages of the invention, as well as others which will become apparent, are attained and can be understood in detail, more particular description of the invention briefly summarized above may be had by reference to the embodiments thereof which are illustrated in the drawings, which drawings form a part of this specification. It is to be noted, however, that the appended drawings illustrate only preferred embodiments of the invention and are therefore not to be considered limiting of its scope, for the invention may admit to other equally effective embodiments.

Figure 4:
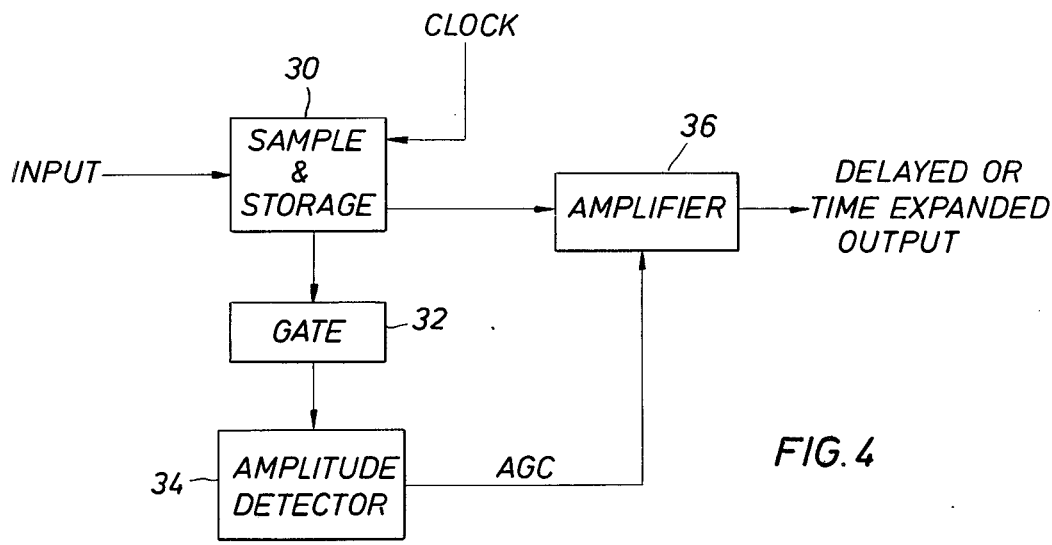

IN THE DRAWINGS:

FIG. 1 is a schematic representation of a well-logging tool useful in making acoustic velocity measurements.

FIG. 2 is an amplitude versus time representation of typical well-logging signals detected by the receiver in the system shown in FIG. 1.

FIG. 3 is a block diagram of a simplified version of a preferred embodiment as described herein.

FIG. 4 is a simplified block diagram of another embodiment of the invention as described herein.

Figure 5:
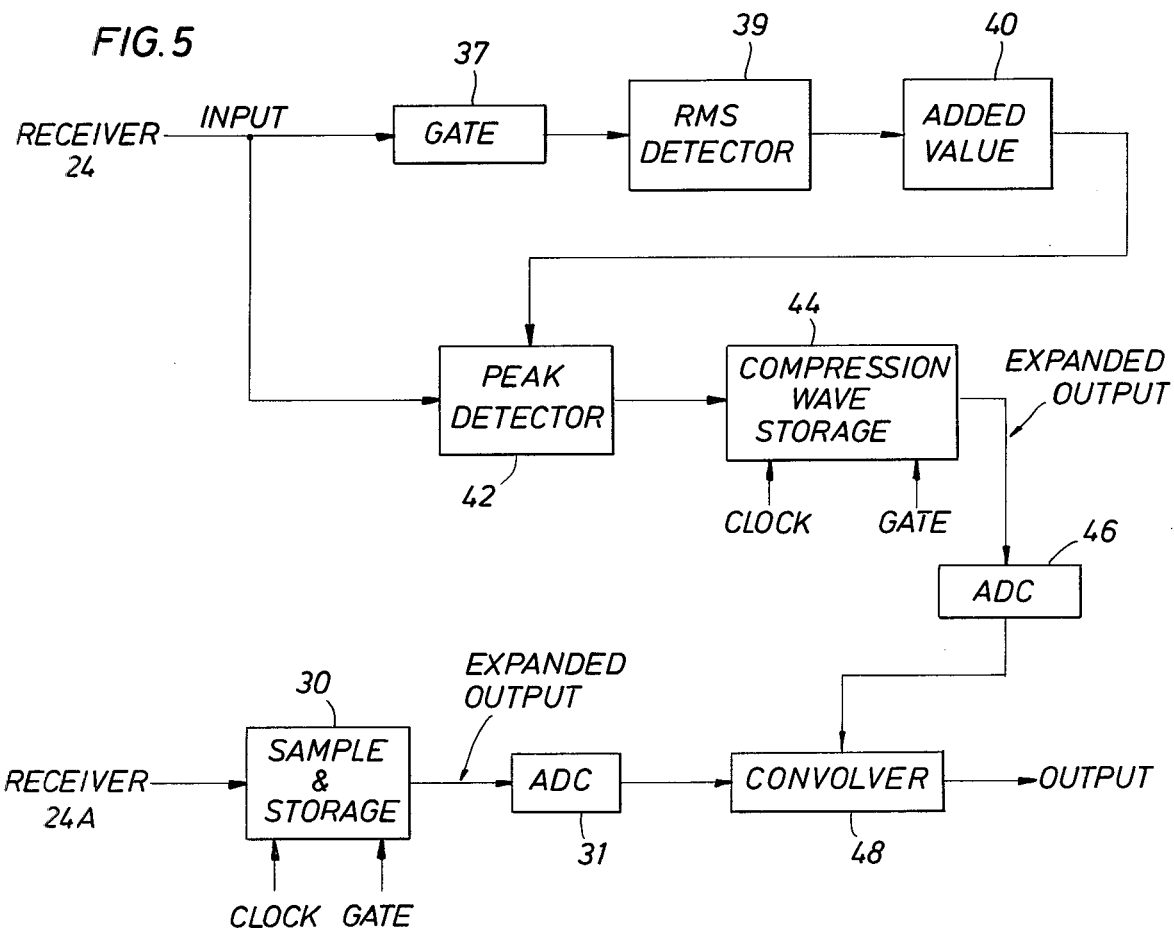

FIG. 5 is a simplified block diagram of yet another version of a preferred embodiment of the invention described herein.

DESCRIPTION OF PREFERRED EMBODIMENTS

Acoustic wave energy has been extensively studied by experts for clues to its makeup and characteristics that may be of interest in revealing information valuable in a well-logging application. It is now generally believed that a typical acoustic wave is made up of a number of component parts including the compression wave (also known as the primary wave, the P-wave and the dilatational wave), the shear wave (also known as the secondary wave, the transverse wave and the rotational wave), the pseudo-Rayleigh wave (also known as the Rayleigh-coupled head wave), the Stonely wave, and the extensional or tube wave.

The theory of each of the waves is not important for an understanding of the present invention, but it is known that the formation shear wave and the pseudo-Rayleigh waves (which are surface waves associated with the borehole-formation interface), appear very close in time with one another, and may actually be indistinguishable from each other. Also of note is that a compression wave travels at a rate of about 50-100 microseconds per foot in a typical formation and both a shear wave and/or a pseudo-Rayleigh wave travels at a rate of about 80-160 microseconds per foot. Hence, there is a time separation between a compression wave and a shear wave but not a very noticeable separation between a shear wave and a pseudo-Rayleigh wave. Hence, as used hereinafter, the term "shear" wave includes both of these latter closely associated components that are actually believed to exist. The method and apparatus disclosed herein partly is for the purpose of detecting and distinguishing a "shear" wave in the above sense from a compression wave (which terminology is used hereinafter rather than primary or some other synonymous term).

A compression wave in acoustic energy is a propagating wave traveling in some bulk media in which the particle motion is in the same direction as the direction of propagation of the energy in the acoustic wave. A "shear" wave is a propagating wave traveling in a bulk media in which the particle motion is in a direction at a right angle to the direction of propagation of the energy in the acoustic wave. Compression waves are sustainable both in liquid as well as solid media. "Shear" waves are sustainable in solid media but not in liquid media (at least they are greatly attenuated in liquid media).

A compression wave traveling in a solid (e.g., the formation) along a wall or interface adjacent a fluid excites or stimulates a compression wave in the fluid of relatively low amplitude because the formation particle motion is parallel to the liquid/solid (borehole fluid/formation) interface. A "shear" wave stimulated by the same transmitter or source traveling along the same path will sometimes be a larger and sometimes will be a smaller amplitude wave than the related compression wave, but will proportionally stimulate a larger compression wave in the fluid, because its particle motion is perpendicular to the liquid/solid interface. A receiver spaced apart from the transmitter will receive first the compression wave and then the "shear" wave. It is desirable to locate precisely in time both the compression wave, the "shear" wave and to determine the amplitude values of both.

Now referring to the drawings and first to FIG. 1, an acoustic logging system used to measure compression wave velocity and/or "shear" wave velocity is shown. In such a system a logging tool 10 is suspended in a well bore 12 via a cable 14 that both bears the weight of the tool and includes electrical conductors to carry power and signals to and from surface electronics 16. The tool carries an acoustic transmitter 18 for imparting an acoustic wave impulse via surrounding borehole fluid 20 into adjacent formation 22. In the illustration, the transmitter is shown near the bottom of the tool; however, in an actual installation, the transmitter may be located near the top of the tool. In any event, the transducer arrangement for the transmitter is aligned such that the acoustical energy emitted therefrom passes through the fluid in the borehole by compression wave action and enters the wall of the borehole. It is convenient to illustrate by arrows in accordance to ray theory (although this is an inexact theoretical explanation of what really occurs) that a complex acoustic wave travels up the interface of the borehole and excites wave motion in fluid 22 so that acoustic wave motion is received by a receiver 24 carried in the tool and spaced apart from transmitter 18 and at a receiver 24A carried in the tool above receiver 24. The transmitter and receivers are also electronically connected inside the tool so that an initializing of an acoustic wave by the transmitter is also received at each of the receivers.

FIG. 2 illustrates in a combination analog logging signal a nominal signal as detected by the receivers. The signal detected by receiver 24 is shown in the top waveform and the signal detected by receiver 24A is shown in the lower waveform. The transmitter burst is first received, after which the signal decays to only a nominal value, reflective of the inherent noise of the system. The compression wave is the next part of the signal to arrive, followed by the "shear" wave. Casually observing and separating the compression wave and "shear" wave is usually not possible since the acoustic energy from multiple paths and reflections from the compression wave usually still exists when the onset of the "shear" wave occurs and thereafter the two waves result in an overlapping complex signal. Therefore, in order to separate the compression wave from the "shear" wave, refinements in data treating the signal are made. Also, the exact onset of the compression wave is not easy to determine.

Generally speaking valuable information is contained in the velocity (travel time occurrence) of the compression wave, velocity (travel time occurrence) of the "shear" wave, and amplitude of the compression wave (and of the "shear" wave). The information relates to the lithological character of the geological formation.

Now referring to FIG. 3, the imput acoustic logging signal, as described above, is applied as an input to a sample and storage device 30 such that a real time portion, on the order of 5 milliseconds long, is sequentially sampled, the adjacent discrete segments sampled being stored in the device. Typically, there will be storage capacity for 2000 such segments sampled at a sampling rate of two microseconds. A device capable of such sampling and storage is the Reticon R5101 2000-Sample Analog Delay Line. This device is capable of holding 2000 samples for approximately 0.5 seconds. The clock signal, which is applied to the device, may clock the stored segments out of the device over an extended time period which is much longer than the real time portion of the sampled signal. For example, whereas the real time portion of the signal is 5 milliseconds long, the 2000 stored values may be clocked out over a period of approximately 45 milliseconds. As explained hereafter, the expanded output can be used for a number of different purposes.

A refined version of the system shown in FIG. 3, is illustrated in FIG. 4. In this embodiment, the input is applied to sample and storage device 30, which is also connected to a clock signal for sequentially clocking the output out over an expanded or delayed period of time.

Gate 32 samples a portion of the stored values for supplying to amplitude detector 34. For example, there is a period of time in FIG. 2 where there is inherent system noise but no meaningful signals are being received at the receiver. The gate permits a portion of this "noise" (marked "thresholds" in FIG. 2) to be applied to the amplitude detector, which then generates an AGC signal for application to amplifier 36. Amplifier 36 is connected to the output of sample and storage device 30 and willl amplify the amplitude of the delayed or time expanded output in accordance with the AGC applied control signal. Such automatic control is a vast improvement over common systems of acoustic well-logging used in conjunction with analog signals wherein an operator constantly monitors the information and amplifies the signal according to his individual skill. Also, no duplicate logging is required since the AGC output is determined simultaneously with the development of the meaningful data signal to be analyzed. The amplitude detector may be either a circuit for developing an output from the rms value of the stored values sampled or it may determine an AGC output depending upon the peak value of the signals which are sampled over the gated period of time. The output of the amplifier is applied to the time measuring circuits of the overall system.

FIG. 5 illustrates a convolving technique for actually determining the time of arrival of the compression wave in the acoustic logging signal, and the arrival time of the "shear" wave, as well. In this embodiment, the input from a receiver 24A is applied to sample and storage device 30, as in the FIG. 3 embodiment. Alternatively, the entire arrangement, as illustrated in FIG. 4, can be used. Also, however, the input from receiver 24, which is located in the tool closer to transmitter 18 than is receiver 24A, is applied to a gate 37, which detects the rms value of the inherent system noise portion of the applied signal in rms detector 39, as described above. This value is either multiplied by a fixed amount or a fixed amount is added to it by added value device 40, the output of which establishes the threshold for peak detector 42. The acoustic logging signal from receiver 24 is also applied to peak detector 42, which develops outputs for values thereof which are in excess of the threshold value set. It will be seen, by referring to the signal illustrated in FIG. 2 for receiver 24, that the threshold is above any of the noise which appears in the portion of the signal preceding the presence of the compression wave. As the compression wave exceeds the noise amplitude valve, with the onset of the compression wave, there will be first one, then another and then another and so on samples of the wave which will be detected. It is assumed that if there are as many as three such samples which are above threshold that the compression wave has arrived. The first of these samples will be presumed to be the wave front of the compression wave. Compression wave storage device 44 stores the first several cycles of the compression wave which has been thus determined and applies it in expanded time through analog-to-digital converter (ADC) 46 to convolver 48, the other input of which is the expanded digitized output from sample and storage device 30. ADC circuit 31 provides digitization to the output of device 30. By convolving the expanded logging signal from receiver 24A with the presumed compression wave signal, the actual presence, arrival time and amplitude of the compression wave is determinable. Also, since the "shear" wave approximates the shape of the compression wave, which is related to it, further convolving will determine the arrival time and amplitude value of the "shear" wave. Such waves will appear on the output of device 48 for recording and/or data treatment purposes. Obviously, many modifications can be made of this embodiment such as convolving portions of the same received signals with itself or other received signals.

In the above discussion, a safe inherent noise time duration can be accurately determined since it is known that compression waves traveling in geological formations do not travel any faster than about 50 microseconds per foot.

While particular embodiments of the invention have been shown and described, it will be understood that the invention is not limited thereto, since modifications may be made and will become apparent to those skilled in the art. For example, it should be noted that the above discussion has been with respect to acoustic logging and more particularly with respect to identifying and accurately locating and amplitude measuring the compression wave segment thereof and the "shear" wave segment thereof. The time expansion or time delayed technique is also particularly well-suited for measuring the phase differences involved in dielectric constant measurements at high frequency. In fact, any other fast change measurements can employ the hold and time expansion technique to advantage.

I claim:
1. The method of accurately identifying a wave segment in a seismic analog logging signal, comprising
    determining a presumed compression wave in real time, comprising
        selecting a time duration before the receipt of the compression wave in the received signal that includes substantially only inherent received noise,
        determining the rms amplitude value of the received noise during the selected noise time duration,
        presetting a peak detector to have a value equal to the determined rms value plus a predetermined added value,
        detecting with the preset peak detector the received signal following the selected noise time duration for the presumed presence of the compression wave by analog sampling the amplitude at regular intervals, three successive samples of received signal from the peak detector indicating the presence of the presumed compression wave onset, and
    storing the amplitude values of a predetermined length of the presumed compression wave,
    sequentially analog sampling the amplitude values of a real time portion of the logging signal in adjacent discrete time segments,
    sequentially individually storing the sampled amplitude values,
        reading the stored amplitude values of the presumed compression wave over an expanded period of time in excess of the real time duration of the sampled portion,
        convolving the stored amplitude values of the sequentially stored sampled amplitude values over an expanded period of time in excess of the real time duration of the sampled portion with respect to the read presumed compression wave to detect the wave segment.

2. The method in accordance with claim 1, wherein the steps of determining said presumed compression wave results from detecting the logging signal using a first receiver and the step of sequentially sampling the analog signal results from detecting the logging signal using a second receiver spaced further from the source creating the logging signal than said first receiver.

3. The method in accordance with claim 1, wherein said stored presumed compression wave and said stored sequentially sampled amplitude values of said logging signal are digitized prior to said convolving.

4. Apparatus for processing a received seismic analog logging signal, comprising
an analog sampling and storage means for sequentially amplitude sampling the values of a real time portion of the received signal in adjacent discrete segments,
a clock connected to said sampling and storage means for sequentially clocking said stored amplitude values over an expanded period of time which is greater than the time of the real time portion,
an amplifier connected to the output of said sampling and storage means,
gate means for sampling a fixed number of stored sampled amplitude values from said sampling and storage means,
automatic gain control means for developing a variable output related to an amplitude characteristic of the stored sampled amplitude values from said gate means, said automatic gain control means connectable to control the amplification of said amplifier,
means for determining and storing a presumed compression wave of the logging signal in real time, comprising;
gate means connected to the logging signal for selecting a time duration before the receipt of the compression wave in the received signal that includes substantially only inherent received noise,
rms detector means connected to said gate means for determining an output proportional to the rms value of the input passed through said gate means,
means for adding a predetermined value to the output of said rms detector means,
a peak detector connected to the logging signal having its threshold detector value preset by the output of said adding means, said peak detector including sampling means for detecting the presence of occurrence of the first three sampled amplitude values of the logging signal above the preset threshold,
storing means connected to said peak detector for recording a portion of the detected logging signal beginning with the first of the three values of the logging signal,
and including convolving means connected to the output of said sampling and storage means for convolving in delayed time the recorded portion of the detected logging signal with respect to the time-expanded amplitude values of the sampled portion of the logging signal.

5. Apparatus in accordance with claim 4, wherein said automatic gain control develops a variable output related to the rms amplitude characteristic of the stored sampled amplitude values.

6. Apparatus in accordance with claim 4, wherein said automated gain control means develops a variable output related to the peak amplitude characteristic of the stored sampled amplitude values.

7. Apparatus in accordance with claim 4, and including digitizing means connected to said sampling and storage means and means connected to the output of said storing means for digitizing the output therefrom before being supplied to said convolving means.

* * * * *